United States Patent Office 3,236,608
Patented Feb. 22, 1966

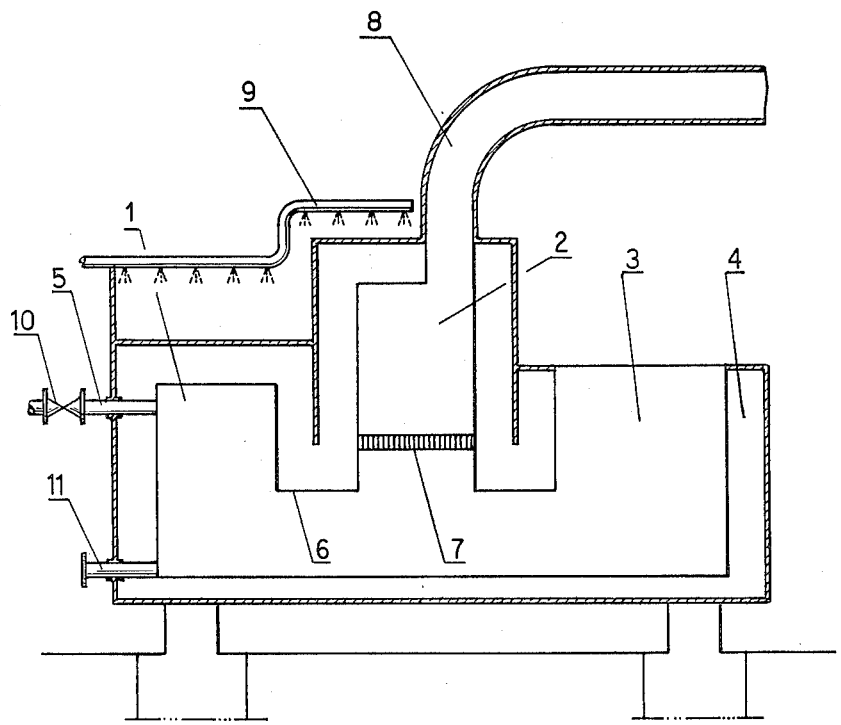

3,236,608
APPARATUS FOR THE HALOGENATION
OF METALS
Vittorio Cavadini, Cengio, Savona, and Luigi Telloli,
Milan, Italy, assignors to Aziende Colori Nazionali
Affini—Acna S.p.A., a corporation of Italy
Filed Apr. 16, 1962, Ser. No. 187,652
Claims priority, application Italy, Apr. 18, 1961,
7,169/61
2 Claims. (Cl. 23—285)

This invention relates to an apparatus for industrial production of metallic halides, and more particularly to apparatus for the formation of aluminum chloride, in which the reaction takes place between the metal in the molten state and the gaseous halogen bubbling therein.

Halogenation of metals occurring in molten state at the reaction temperature has heretofore been carried out industrially in types of equipment which have only partially solved the numerous chemical, technological and economic problems involved in satisfactory operation. The known reaction apparatuses are basically a metallic container lined with refractory material, or a container made solely of refractory material, in which under operating conditions the melted metal reacts with gaseous halogen, which may be pure or mixed with an inert gas, the halogen gas gliding over the surface as in "licking" reactors or being bubbled within the molten metal through injector pipes as in "bubbling" reactors.

The licking reactors substantially comprise a vessel with continuous walls. Owing to their simple structure, they display good resistance to the thermal, mechanical and chemical stresses present, and they last long enough to defray their cost. However, they exhibit the great disadvantage of producing very low yields with respect to the halogen expended, since not all the gas admitted into the reactor is able to contact the metal being hindered by the floating slags formed upon the bath. Therefore, a portion of unreacted halogen leaves the apparatus together with the formed gaseous halide. The problem thus arises of corrosion of the equipment, downstream of the reactor, and also of recovery or of disposal of unreacted halogen, both problems being difficult to solve. Neither of the latter problems arise in the case of bubbling reactors, wherein the reaction proceeds in almost complete manner. However, bubbling reactors are deficient because of their burdensome and irregular operation. In fact, heretofore the injection of halogen into the molten metal mass has been carried out with bubbling pipes the resistance of which to the severe corrosive operating conditions of the reactor is limited, even when recourse is had to expensive special materials in their construction. The frequent replacement of the injectors, which replacement, cannot as a rule, be accomplished when the reactor is running, involves undesired interruption of operation, and marked maintenance burdens. The possibility that an injector may break over, or immediately under, the molten metal level involves the danger, which is all but impossible of solution, of the passage of halogen downstream of the reactor. Moreover, it is difficult to avoid local overheating, when bubbling pipes are used.

In the present state of the technique, economical industrial production of halides of metals occuring in molten state, at the temperature at which the reaction is allowed to proceed, is intimately connected with and dependent upon the best solution of the problem of providing a reactor which is simple in construction, has no excessively stressed parts (as for instance the bubbling pipes), and which works without interruption, with continuous feeding of the metal and of the halogen into intimate and complete contact with each other.

The apparatus of the present invention fully attains said purpose, since it provides a reactor simple and compact in form, and further presents a very corrosion resistant structure, like that of licking reactors, as well as permitting the obtaining of the high yields characteristic of bubbling reactors. Said apparatus basically comprises two contiguous chambers separated by an hydraulic seal formed by a small head of melted metal. Halogen is admitted into one of the two chambers under slight pressure sufficing merely to permit passage of gas through the hydraulic seal. In this chamber is initiated the reaction and the formation of the halide in gaseous state. Halogen and the gaseous halide that is formed bubble through the hydraulic seal, so that when the reaction is completed, only the halide vapors pass into the contiguous chamber.

The invention will be described in detail, with reference to the enclosed schematic drawing of an apparatus in section. The reactor comprises a single body of sheet metal divided into three chambers 1, 2, 3, communicating with each other in the lower parts thereof. Inlet chambers 1 and collection chamber 2 are closed at the top, whereas charging chamber 3 is open at the top.

The sheet metal is completely lined internally with a suitable refractory material 4, which is an alumina or graphite refractory, of any suitable type. The refractory is fastened in place with a suitable cement having a thermal expansion coefficient near that of the refractory and which is resistant to chemical attack by the halogens. The cement should also have good thermal conductivity.

To start the operation, the reactor is filled with melted metal to a level such that the passages through which the three chambers communicate with each other remain submerged under a head of a few centimeters. As the reaction proceeds, the molten metal level is kept constant by charging solid metal into chamber 3, the metal melting owing to the reaction heat transmitted by conduction from the molten metal. Gaseous halogen is admitted from nozzle 5 into chamber inlet 1, above the molten metal level, under a pressure sufficient to cause bubbling through the hydraulic seal formed by the submerged transverse sill 6. The reaction starts when halogen comes in contact with the metal surface, and goes to completion during the bubbling, so that only the gaseous halide arrives in the chamber 2 through the splash arrester 7. Chamber 2 is connected through pipe 8 to the condensation, collection, and packing equipment (not shown) of the powdered halide. Thermal regulation of the reactor in operation is maintained by dispersing the excess reaction heat through the walls of chambers 1 and 2, by sprinkling their outside surface with water coming from sprayer 9. In reactors of higher capacity, when the thermal balance requires it, the bottom and sometimes a portion of the walls under the free surface of molten metal, which undergo less severe chemical attack, may be lined with a reduced thickness of refractory material or simply not lined, to promote dispersion of the heat. Moreover, temperature control means (not shown) located in the metal bath, for example, through the top opening of charging chamber 3, are used to regulate the halogen intake, by regulating valve 10. Besides control of temperature, control of the molten bath level, with maximum and minimum level indications, is employed to avoid excessive internal pressure of the level, when it is too high, and above all to eliminate losses of unaltered chlorine which could take place if the necessary head of molten metal should be absent.

When discontinuance of halide preparation is desired, the halogen inlet is closed, the molten metal being discharged through the pouring nozzle 11.

We claim:
1. Apparatus for the production of metal halide in gaseous form from the reaction of a halogen with the molten metal, comprising an enclosed structure having depending walls which subdivide the structure into an adjacent inlet chamber and a collection chamber, the lower portion of said depending walls having openings through which said chambers intercommunicate and which when in operation form first hydraulic seal means; metal charging means; a sill for forming second hydraulic seal means; said intercommunicating chambers further communicating through said second seal means with said charging means; said chambers being provided with molten metal for activating said hydraulic seal means; said inlet chamber having an inlet for the halogen above the surface of the molten metal, said collection chamber having an outlet for the gaseous metal halide; said charging means providing a source for the solid metal and the molten metal; said first hydraulic seal means being actuated by the level of said molten metal to permit bubbling of unreacted halogen and reacted halide from said inlet chamber to said collecting chamber through the molten metal when the gaseous head in said inlet chamber exceeds the hydrostatic head of the molten metal in said first hydraulic seal means; said second hydraulic seal means, connecting to said charging means, being positioned to prevent the bubbling of said gases therethrough.

2. In apparatus according to claim 1, said charging means comprising a third chamber adjacent to said collecting chamber and intercommunicating therewith through said second hydraulic seal means.

References Cited by the Examiner

UNITED STATES PATENTS

| | | | |
|---|---|---|---|
| 701,186 | 5/1902 | Faulkner | 196—118 X |
| 3,052,518 | 9/1962 | Frey | 23—285 X |
| 3,078,145 | 2/1963 | Gayol | 23—93 |

MORRIS O. WOLK, *Primary Examiner.*

JAMES H. TAYMAN, JR., *Examiner.*